United States Patent [19]

Glabe et al.

[11] 4,196,195

[45] * Apr. 1, 1980

[54] FEEDING BEEF CATTLE

[75] Inventors: Elmer F. Glabe, Northbrook, Ill.; Herbert J. Rebhan, New Richmond, Wis.

[73] Assignee: Food Technology Products, Chicago, Ill.

[*] Notice: The portion of the term of this patent subsequent to Dec. 11, 1996, has been disclaimed.

[21] Appl. No.: 953,026

[22] Filed: Oct. 20, 1978

[51] Int. Cl.² .............................................. A23K 1/00
[52] U.S. Cl. .................................. 424/177; 424/317; 426/2; 426/807
[58] Field of Search .................. 426/2, 335, 532, 583, 426/807, 630, 635, 53, 54; 424/177, 180, 311, 317

[56] References Cited

U.S. PATENT DOCUMENTS

| | | | |
|---|---|---|---|
| 3,925,559 | 12/1975 | Glabe et al. | 426/2 |
| 4,015,018 | 3/1977 | Glabe et al. | 426/2 |
| 4,016,294 | 4/1977 | Glabe et al. | 426/807 X |

Primary Examiner—R. B. Penland
Attorney, Agent, or Firm—Richard L. Johnston

[57] ABSTRACT

Beef cattle are fed with a synergistic mixture of sodium diacetate and dehydrated whey in sufficient amounts to increase feed efficiency.

10 Claims, No Drawings

FEEDING BEEF CATTLE

BACKGROUND

In U.S. Pat. No. 4,015,018 issued Mar. 29, 1977, there is described a composition consisting essentially of sodium diacetate and dehydrated whey which is used to enhance the production of silage. This composition is a synergistic combination of edible non-toxic substances which aid in the fermentation of silage at an earlier stage in the fermentation process and inhibit the formation of undesirable butyric acid.

OBJECTS

One of the objects of the present invention is to provide a method of feeding beef cattle so as to enhance feed efficiency.

Another object of the invention is to provide a method of feeding beef cattle so as to enhance weight production. Other objects will appear hereinafter.

BRIEF SUMMARY OF THE INVENTION

In accordance with the invention a synergistic mixture of sodium diacetate and dehydrated whey is used in feeding beef cattle in sufficient proportions to increase feed efficiency and enhance weight production.

DETAILED DESCRIPTION OF THE INVENTION

Sodium diacetate is non-toxic to man or animals since it metabolizes directly to carbon dioxide and water, leaving no residue in the tissues. It is not corrosive to equipment and may be safely handled by human beings using ordinary precautions.

Dehydrated whey is obtained by drying liquid whey which is a principal by-product of the cheese industry and is obtained after the removal of casein and fat from milk which is processed in making cheese. The residual liquid which contains protein, lactose and lactoalbumen as well as minor amounts of fat and minerals usually contains over 90% water which is largely removed by spray drying or some other form of dehydration to produce the dehydrated whey solids that are employed in the practice of the present invention. A typical analysis of dehydrated whey is as follows:

| | |
|---|---|
| Moisture | 4.5 |
| Protein* | 12.9% |
| Fat | 1.1% |
| Total carbohydrate | 73.5% |
| Ash (calcium, phosphorous, iron) | 8.0% |

*50% lactoalbumen
**the carbohydrate is virtually all lactose, only a fraction of a percent is dextrose.

A typical additive for use in preparing beef cattle feeds in accordance with the invention has the following composition:

TABLE I

| Ingredients | Per Cent by Weight |
|---|---|
| Sodium diacetate | 50 |
| Spray-dried whey | 35.3 |
| Calcium carbonate | 8.2 |
| Bentonite (a silicate compound) | 5.0 |
| Mineral or Coconut Oil | 1.0 |
| Zeolex (sodium aluminosilicate anti-caking agent) | .50 |

TABLE I-continued

| Ingredients | Per Cent by Weight |
|---|---|
| | 100.00% |

Another example of the additive suitable for use in preparing beef cattle feeds in accordance with the invention has the following composition:

TABLE II

| Ingredients | Per Cent by Weight |
|---|---|
| Sodium diacetate | 50 |
| Roller Dried Whey | 13.333 |
| Mineral bentonite | 31.6 |
| Mineral Salt (e.g., sodium chloride) | 3.333 |
| Zeolex (sodium aluminosilicate) | 0.667 |
| Mineral Oil | 0.50 |
| Trace Minerals | 0.067 |
| Liquid Wax | 0.500 |
| | 100.00% |

Another example of an additive suitable for use in preparing cattle feeds in accordance with the invention is the following:

TABLE III

| Ingredients | Per Cent by Weight |
|---|---|
| Sodium diacetate | 50 |
| Roller Dried Whey | 3.333 |
| Mineral bentonite | 31.6 |
| Mineral Salt (e.g., sodium chloride) | 13.333 |
| Zeolex (sodium aluminosilicate) | 0.667 |
| Mineral Oil | 0.50 |
| Trace Minerals | 0.067 |
| Liquid Wax | 0.500 |
| | 100.00% |

Of the above ingredients, sodium diacetate and whey are the only effective components for the purpose of the invention. Calcium carbonate and bentonite are anti-humectants for sodium diacetate and whey. They act as free-flowing agents permitting easy distribution. The coconut oil or mineral oil is an anti-dusting factor. Other anti-humectants and other anti-dusting factors which are edible inert substances as well as non-toxic can be employed. These substances generally have no substantial effect on the feed efficiency of the beef cattle feed. In general, the sodium diacetate will comprise 20–75% by weight of the additive composition and the weight ratio of sodium diacetate to dehydrated whey will be within the range of 25:1 to 1:4. The amount of dehydrated whey is preferably at least 3% by weight of the composition and the amount of inert ingredients preferably does not exceed 47% by weight of the composition.

The invention is practiced by feeding beef cattle using standard beef cattle feeds with standard supplements, e.g., DOBOY TEND-R-LEEN, together with conventional ingredients, including hay, corn, oats, corn silage, silage made from hay (haylage) with the addition of a sodium diacetate-dehydrated whey composition of the type set forth in Tables I, II, and III. The cattle can also be given a free choice whereby the additive is fed separately.

While the sodium diacetate-dehydrated whey composition is usually mixed with one of the components of the feed or with the feed as a whole, it can also be eaten directly by the cattle and for this purpose can be prepared in the form of a pulverized cake or pressed pellets. Pellets or tablets prepared from the compositions illustrated in Tables I, II and III can also be mixed with any of the components of a conventional beef cattle feed, for example, hay, haylage, corn silage, cereal grain, or supplements, and the resultant mixture fed to the cattle. The mixture containing sodium diacetate and dehydrated whey can also be prepared in the form of a large cake which can be placed in one section of the barn where the cattle will lick it and then proceed to eat a conventional beef cattle feed in another location. Usually when the sodium diacetate-dehydrated whey composition is added to the cattle feed, it is preferable to add it to the grain mixture component of the cattle feed.

The invention will be further illustrated but is not limited by the following example in which the quantities are by weight unless otherwise indicated.

EXAMPLE

Two pens of shorthorn steers were tested and the invention evaluated. In the first pen 8 steers were fed with free choice by placing a box containing a granular mixture of the composition of Table III a short distance away from the regular feed box so that the steers would eat the composition of Table III and then proceed to the regular feed box. In the second pen 9 steers were used as a control and were not fed with the composition of Table III. The standard feed employed consisting of corn, oats and a standard supplement known as DOBOY 375 which was fed to the steers in both pens. Thus, the only difference was in the first pen where the steers were given a free choice and consumed the composition of Table III along with the standard feed. The test was carried out for 71 days and the following results were observed.

TABLE IV

|  | Pen 1 (w/additive) | Pen 2 |
|---|---|---|
| Starting weight | 824.3 | 773.6 |
| 71 Day weight | 1112.50 | 1003.1 |
| Gain | 288.2 | 299.5 |
| Average Daily Gain (ADG) | 4.06 | 3.23 |
| No. of Steers | 8 | 9 |
| Corn Consumed | 12075 | 10875 |
| Standard Supplement (DOBOY 375) | 850 | 950 |
| Oat Feed | 1000 | 1000 |
| Table III composition | 50 | -0- |
| Total Feed Consumed | 13975 | 12825 |
| Total Gain | 2305.6 | 2065.5 |
| Feed per pound of gain (feed efficiency) | 6.06 | 6.21 |
| Average Daily Feed Consumed | 24.60 | 20.06 |

The results show that the steers fed the composition of Table III free choice made faster gains than controls. These steers consumed 1.4 ounces per head per day of said composition on a free choice basis. On the basis of total feed consumed, the quantity of the aforesaid sodium diacetate-dehydrated whey composition was 0.357% and on the basis of the quantity of sodium diacetate the amount of sodium diacetate was 0.178%.

In general, it appears that effective results can be obtained with synergistic compositions of the type described in which the total amount of beef cattle intake is 0.025% to 0.25% of sodium diacetate by weight of the total feed and the quantity of dehydrated whey is at least 4% by weight of the total sodium diacetate and whey. Especially good results have been obtained where the quantity of sodium diacetate is approximately 0.15 to 0.20% by weight of the beef cattle feed intake.

It will be understood that the invention is susceptible to other variations and modifications in the manner of its practical application.

The invention is hereby claimed as follows:

1. A process of feeding beef cattle which comprises feeding beef cattle with a quantity of sodium diacetate and dehydrated whey mixed together and fed as a feed additive as such or in a mixed feed, in sufficient proportions to enhance feed efficiency of such beef cattle, the quantity of sodium diacetate being within the range of 0.025% to 0.25% by weight of the feed and the quantity of dehydrated whey being at least 4% by weight of the total sodium diacetate and whey, the weight ratio of sodium diacetate to dehydrated whey being within the range of 25:1 to 1:4.

2. A process as claimed in claim 1 in which the sodium diacetate and dehydrated whey mixed together are added to a mixed feed eaten by beef cattle.

3. A process as claimed in claim 1 in which the sodium diacetate and dehydrated whey mixed together is fed to the cattle separately or in the grain portion of cattle feed.

4. A process as claimed in claim 1 wherein said sodium diacetate and said dehydrated whey are added to the feed fed to beef cattle as a mixture in which the quantity of sodium diacetate is 20–75% by weight and the quantity of dehydrated whey is at least 3% by weight, the remainder being edible inert substances.

5. A process as claimed in claim 4 wherein the quantity of sodium diacetate is approximately 50% by weight and the quantity of dehydrated whey is approximately 35% by weight of said mixture.

6. A process as claimed in claim 4 wherein the quantity of sodium diacetate is approximately 50% by weight of said mixture and the quantity of dehydrated whey is approximately 13–14% by weight of said mixture.

7. A process as claimed in claim 4 wherein the quantity of sodium diacetate is approximately 50% by weight of said mixture and the quantity of dehydrated whey is approximately 3–4% by weight of said mixture.

8. Beef cattle feed consisting essentially of at least one ingredient selected from the group consisting of hay, haylage, corn silage and grain to which has been added a mixture of a quantity of sodium diacetate and dehydrated whey in proportions sufficient to enhance feed efficiency when fed to beef cattle, the quantity of sodium diacetate being within the range of 0.025% to 0.25% by weight of the feed and the quantity of dehydrated whey being at least 4% by weight of the total sodium diacetate and whey, the weight ratio of sodium diacetate to dehydrated whey being within the range of 25:1 to 1:4.

9. A beef cattle feed as claimed in claim 8 wherein said cattle feed comprises grain to which said mixture of sodium diacetate and dehydrated whey has been added.

10. A beef cattle feed as claimed in claim 8 wherein the quantity of sodium diacetate is approximately 0.15% to 0.20% by weight of said feed.

* * * * *